Figure 1:
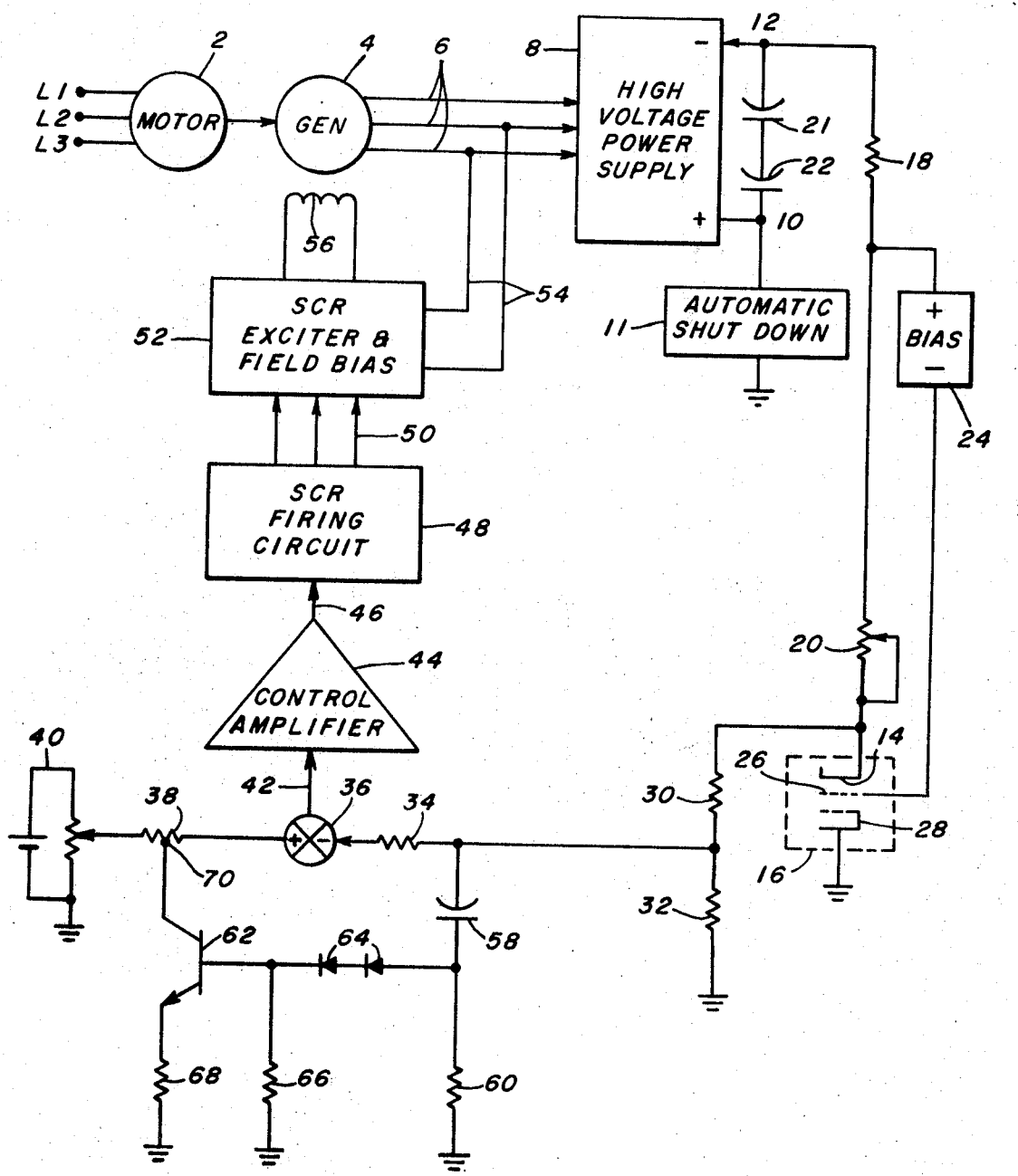

United States Patent [19]
Rudolph

[11] 3,749,979
[45] July 31, 1973

[54] ELECTRICAL DISCHARGE SUPPRESSION CIRCUIT

[75] Inventor: Ralph G. Rudolph, Edgewood Borough, Pa.

[73] Assignee: United States Steel Corporation, Pittsburgh, Pa.

[22] Filed: Sept. 2, 1971

[21] Appl. No.: 177,233

[52] U.S. Cl. ............... 317/16, 317/31, 317/33 VR, 317/33 C, 315/307, 219/110
[51] Int. Cl. ................... H02h 3/24, H02h 9/02
[58] Field of Search ............... 317/33 VR, 16, 33 C, 317/31; 315/307, 308; 323/9; 219/108, 110, 114, 131, 133

[56] References Cited
UNITED STATES PATENTS

| | | |
|---|---|---|
| 3,201,606 | 8/1965 | Mamon .................................. 317/31 |
| 3,599,042 | 8/1971 | Andrews ................................ 317/31 |
| 3,366,871 | 1/1968 | Connor ........................... 317/33 VR |
| 3,349,217 | 10/1967 | Helms ................................ 219/108 |
| 3,507,096 | 4/1970 | Hall .................................... 315/308 |

Primary Examiner—J. D. Miller
Assistant Examiner—Harvey Fendelman
Attorney—Rea C. Helm

[57] ABSTRACT

A circuit to reduce the severity of high voltage transients in a regulated high voltage power supply. When an arc discharge occurs, a high voltage feedback signal is reduced to zero activating an additional circuit to reduce a feedback reference signal to zero for a predetermined time interval. With both signals at or near zero, the control circuit will not increase the high voltage power supply output until the end of the time interval.

3 Claims, 2 Drawing Figures

ELECTRICAL DISCHARGE SUPPRESSION CIRCUIT

This invention relates to a feedback control circuit for use in a regulated high voltage power supply and more particularly, to a circuit to reduce the severity of high voltage transient discharges in electron beam welders.

Electron beam devices used in vacuum chambers, such as welders, strip heaters and evaporation guns use a regulated high voltage power supply for the beam power. Localized bursts of gas or other contaminants in such electron beam devices cause transient or sustained electrical discharge of the high voltage and therefore effective short circuiting of the high voltage to ground which is frequently detrimental to the process involved. For instance, if the electron beam is being used for welding, no welding will occur during the transient resulting in an unwelded area along metals being joined. In addition, the discharge transient may be severe enough to damage the power supply or electron beam device components so that it is desirable to minimize the length of time that a transient is in existence.

In accordance with my invention, a capacitor is provided in the feedback control circuit and is discharged when a transient occurs, turning on a transistor. The transistor then connects an input of a control amplifier in the feedback loop to ground thereby preventing the control amplifier from increasing the beam current during the transient discharge thereby suppressing the effect of the discharge.

It is therefore an object of my invention to provide a circuit to reduce the magnitude of electrical discharge transients of a regulated high voltage control system.

Another object is to provide an electronic circuit which controls the length of time an electrical discharge occurs.

Figure 2:
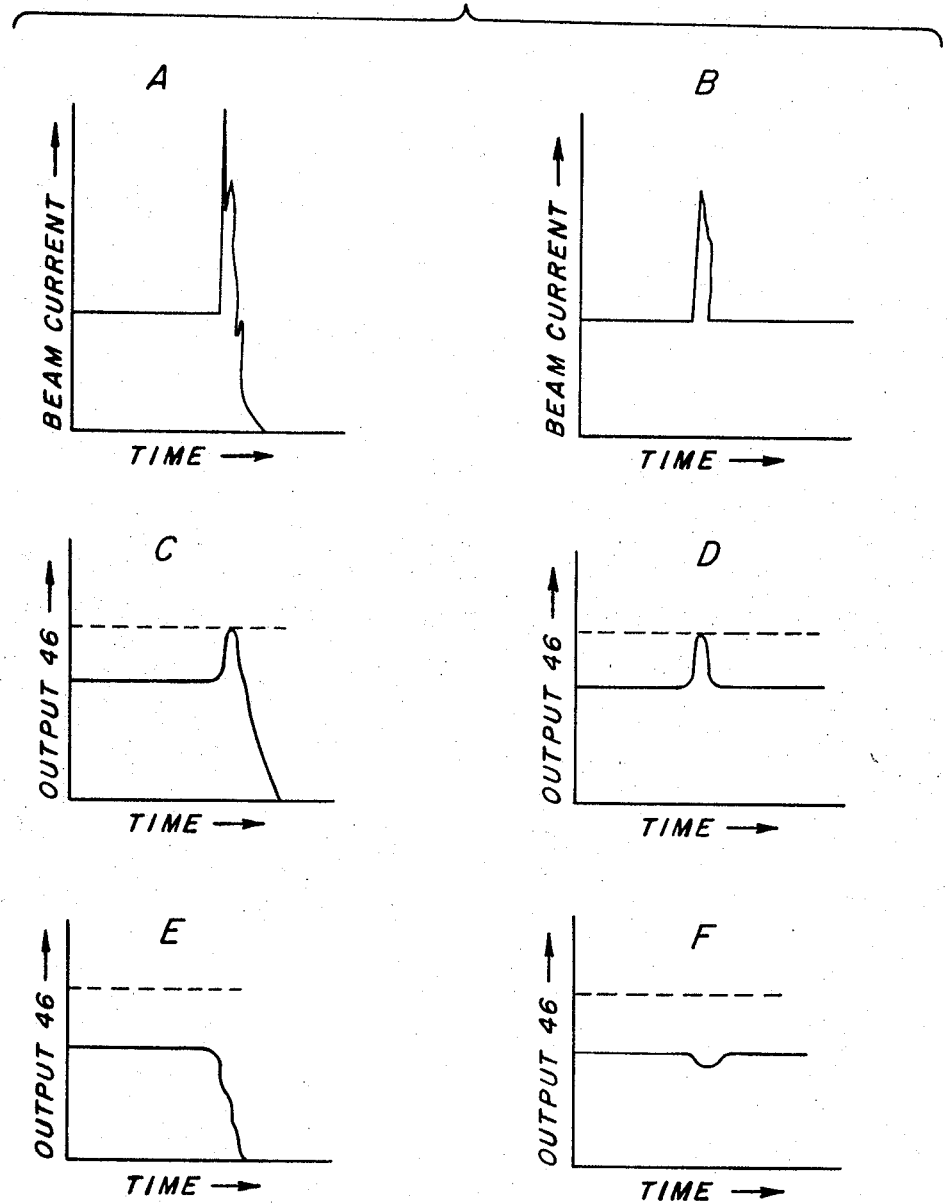

These and other objects of my invention will become more apparent after referring to the following specification and attached drawings in which:

FIG. 1 is a schematic diagram of a regulated high voltage control system with the control circuit of my invention; and FIG. 2 is a series of graphs showing the effect of a high voltage transient and the circuit of my invention.

Referring more particularly to FIG. 1, reference numeral 2 indicates a motor driving a generator 4 supplying power through lines 6 to a direct current high voltage supply 8. Motor 2 is powered by a three-phase alternating current supply L1, L2, and L3. Power supply 8 has a positive terminal 10 connected to ground through an automatic shutdown circuit 11 and a negative terminal 12 connected to a cathode 14 of an electron beam gun 16 through a fixed resistor 18 and a variable resistor 20. Two capacitors, 21 and 22, are connected in series between terminals 10 and 12. A bias supply 24 has a positive terminal connected to the junctions of resistors 18 and 20 and a negative terminal connected to a grid 26 of electron beam gun 16. Gun 16 has an anode 28 connected to ground. A resistor 30 and a resistor 32 are connected in series between cathode and ground. A resistor 34 is connected between the junction of resistors 30 and 32 and a summing junction 36. A resistor 38 is connected between summing junction 36 and a potentiometer 40. Summing junction 36 has an output 42 connected as an input to a rate-proportional-reset type control amplifier 44. Amplifier 44 has an output 46 connected to an input of a SCR firing circuit 48. Circuit 48 has an output 50 connected to an input of a SCR exciter and field bias circuit 52 powered by connections 54 from lines 6. A generator field coil 56 for generator 4 is connected to circuit 52. The parts thus far described are the essential features of a conventional feedback control system for an electron beam gun welder 16 in which a high voltage signal through resistor 34 is compared to a reference signal from potentiometer 40 and the resultant error signal is used by amplifier 44 to control circuit 48 and thus the field current in field coil 56. The current in coil 56 determined the output voltage across terminals 10 and 12.

The circuit of my invention has a capacitor 58 with one side connected to the junction of resistors 30 and 32 and the other side connected to ground through a resistor 60. The junction of resistor 60 and capacitor 58 is connected to the base of a transistor 62 through diodes 64. The base of resistor 62 is connected to ground through a resistor 66. The emitter of transistor 62 is connected to ground through a resistor 68 and the collector of transistor 62 is connected to a tap 70 of resistor 38.

In opeation, the difference between voltage signal from the junction of resistors 30 and 32 and the voltage signal from potentiometer 40 controls the control amplifier 44, firing circuit 48, exciter and field bias circuit 52 to set voltage between terminals 10 and 12 at the desired voltage. The more positive the output of summing junction 36, the greater the control signal 42 will be and hence the higher voltage across terminals 10 and 12. When an electrical discharge of the high voltage occurs, the voltage across resistors 18 and 20 is essentially grounded by the discharge. This reduces the voltage signal from the junction of resistors 30 and 32 to zero and raises signal 42 to a high value. Amplifier 44 then acts on circuit 48 to change the output of the high voltage supply 8 its full output. This action is undesirable because it tends to sustain the discharge duration and destructiveness with additional power.

In normal operation the high voltage feedback signal from the junction of resistors 30 and 32 is negative with respect to ground and charges capacitor 58 negative with respect to the side connected to the junctions of resistors 30 and 32 and positive with respect to the side connected to resistor 60. A small alternating current ripple voltage of about one volt flows through resistor 60 to ground. Diodes 64 block this ripple voltage from the base of transistor 62. With no voltage on the base of transistor 58, and leakage current shunted to ground through resistor 66, the transistor 62 is off and does not conduct current. The collector of transistor 62 is in effect disconnected and the control circuit operates as if the additional circuit is not present.

When an air discharge occurs, the voltage signal from the junction of resistors 30 and 32 drops rapidly to effectively zero discharging capacitr 58 through resistors 32 and 60. This generates a positive voltage with respect to ground across resistor 60 causing a current to flow through diodes 62 through resistors 66 and the base of transistor 62 turning transistor 62 on. When transistor 62 turns on, the connection of the collector of transistor 62 to resistor 38 is connected to ground through transistor 62 and resistor 68, shunting out the voltage signal supplied by potentiometer 40. When this occurs, summing junction 36 has no inputs shutting off signal 42 and high voltage power supply 8.

This suppression circuit should remain active for a long enough time to prevent damage to the system. Resistor 68 is selected so that the time constant of capacitor 58 and resistor 68 provides the necessary turn on time for transistor 62. I have found that a time of about 0.2 seconds is very satisfactory. As soon as the time constant elapses or as soon as the discharge extinguishes, transistor 62 will turn off and normal control resumed. If the discharge lasts longer than 0.2 seconds, circuit 11 shuts off high voltage supply 8.

FIG. 2 illustrates the operation of my circuit. FIG. 2A shows the effect of a discharge on the beam current from the steady value to the high level transient where the automatic shutdown circuit 11 shuts off the high voltage supply because the beam current was too high for too long a period of time. FIG. 2B shows the effect of a discharge on the beam current when neither the magnitude nor the duration is sufficient for automatic shutdown circuit 11 to shut off the high voltage supply. FIG. 2C shows the change in output 46 when a discharge occurs where a shutdown occurs as shown in FIG. 2A. The dotted line represents the maximum allowable output 66 as controlled by amplifier 44. FIG. 2D shows the change in output 46 when a discharge occurs where no shutdown occurs as shown in FIG. 2B. Output 46 rises to the dotted line, the maximum allowed by amplifier 44. In FIG. 2E the effect of my suppression circuit is to move output 46 below the operating level when a discharge occurs where a shutdown occurs as in FIG. 2A, and in FIG. 2F the effect of my suppression circuit is to lower output 46 temporarily when a discharge occurs where no shutdown occurs as shown in FIG. 2B.

I claim:

1. In an electron beam device having a high voltage power supply connected to said device, means connected to the cathode of said device for providing a high voltage feedback signal representative of the high voltage impressed upon the cathode, means for providing a reference signal, and control means connected to said means for providing said signals for increasing the high voltage power supply when the feedback signal is smaller than the reference signal; the improvement comprising a capacitor connected to said means for providing said high voltage feedback signal, said capacitor being charged when said high voltage feedback signal is supplied to said control means and discharged upon the loss of said high voltage feedback signal and a transistor having an emitter connected to ground, a collector connected to said means for providing a reference signal and a base connected to said capacitor whereby the discharge of said capacitor turns said transistor on to change said reference signal to zero in response to the loss of the high voltage impressed upon the cathode.

2. A circuit according to claim 1 which includes a resistor connected between said transistor emitter and ground thereby maintaining said transistor on for the time constant of said resistor and said capacitor.

3. A circuit according to claim 2 which includes an automatic shutdown circuit connected to said high voltage power supply whereby said high voltage power supply is disconnected from said device when the current supplied by said high voltage power supply exceeds a predetermined level beyond said time constant.

* * * * *